United States Patent [19]

Omuro et al.

[11] Patent Number: 5,414,537
[45] Date of Patent: May 9, 1995

[54] COLOR IMAGE PROCESSING METHOD AND APPARATUS

[75] Inventors: Hideaki Omuro, Tokyo; Kohei Sakura, Kanagawa; Hidehiko Okada, Kanagawa; Tadashi Tokuyama, Kanagawa; Akira Oryo, Kanagawa, all of Japan

[73] Assignee: Sony Corporation, Tokyo, Japan

[21] Appl. No.: 90,927

[22] Filed: Jul. 14, 1993

[30] Foreign Application Priority Data

Jul. 21, 1992 [JP] Japan .................... 4-215480

[51] Int. Cl.⁶ ...................... H04N 3/08; H04N 5/225
[52] U.S. Cl. .................... 358/518; 358/523; 358/909.1
[58] Field of Search ............... 358/518, 523, 909, 10, 358/406, 445, 451, 447, 504, 509, 512, 537

[56] References Cited

U.S. PATENT DOCUMENTS

| | | | |
|---|---|---|---|
| 4,929,978 | 5/1990 | Kanamori et al. | 358/38 |
| 5,267,030 | 11/1993 | Giorgianni | 358/527 |
| 5,339,176 | 8/1994 | Smilansky | 358/504 |

FOREIGN PATENT DOCUMENTS

0505984  9/1992  European Pat. Off. ....... H04N 5/84

*Primary Examiner*—Edward L. Coles, Sr.
*Assistant Examiner*—John Ning
*Attorney, Agent, or Firm*—William S. Frommer; Alvin Sinderbrand

[57] ABSTRACT

A color image of an object is processed so that the processed image accurately portrays the colors of the object regardless of varying exposure conditions. An object and a color chart that is comprised of a plurality of color chips having known colorimetric parameters are imaged under the same predetermined exposure conditions. Then, colorimetric parameters are determined for each imaged color chip of the imaged color chart. A correlation, between the known and the determined colorimetric parameters, is computed and, on the basis of the computed correlation, the color of the imaged object is corrected.

12 Claims, 7 Drawing Sheets

(COLOR CHART AND OBJECT TAKEN IN SEPARATE FRAMES)

FIG. 8

(COLOR CHART AND OBJECT TAKEN IN SAME FRAME)

COLOR IMAGE PROCESSING METHOD AND APPARATUS

BACKGROUND OF THE INVENTION

1. Field of the Invention

The present invention relates to a color image processing method and a color image processing apparatus suitably used for presenting in substantially true color an image taken by, for example, a video camera.

2. Description of the Related Art

When taking a picture of or imaging an object with a video camera, the object is luminated at a predetermined illuminance with the camera set to a predetermined luminous exposure. A resultant video signal is recorded on a magnetic tape for example. Reproducing the signal from the magnetic tape allows the picture of the imaged object to be presented on a display device such as a cathode ray tube (CRT) or a liquid crystal display (LCD).

However, with a conventional color image processing apparatus, a displayed image may appear different in color from the color of the object before being imaged and/or from one camera used to another depending on camera settings such as gamma curve and white balance. Consequently, the same object taken by different video cameras may present pictures substantially different in color between the cameras.

OBJECTS AND SUMMARY OF THE INVENTION

It is therefore an object of the present invention to overcome the above-mentioned problem, allowing a picture of an object to be displayed in substantially constant color on devices having different characteristics.

In carrying out the invention and according to one aspect thereof, there is provided a color image processing method comprising the steps of taking a picture (imaging) of a color chart having a plurality of color chips at a predetermined exposure, imaging an object at the same exposure as with the color chart, computing a relation between the color of the color chip of the color chart and the color of the color chip of the imaged color chart, and correcting the color of the picture of the object according to a computational result. This computation is performed on a coefficient which, when the color of the color chip of the color chart and the color of the color chip of the imaged color chart are represented respectively in predetermined different colorimetric systems, is used to obtain the color of the object. It should be noted that the color chips of the color chart have colors uniformly arranged in color space. It should also be noted that, when the color chart is photographed with a silver-salt film camera, the color chart and the object may be arranged in the same film frame or in different frames.

Figure 3:
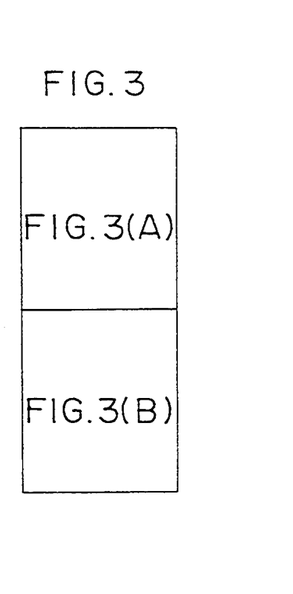
FIG. 3 is a flowchart describing operations of the embodiment of FIG. 1.
Figure 3A:
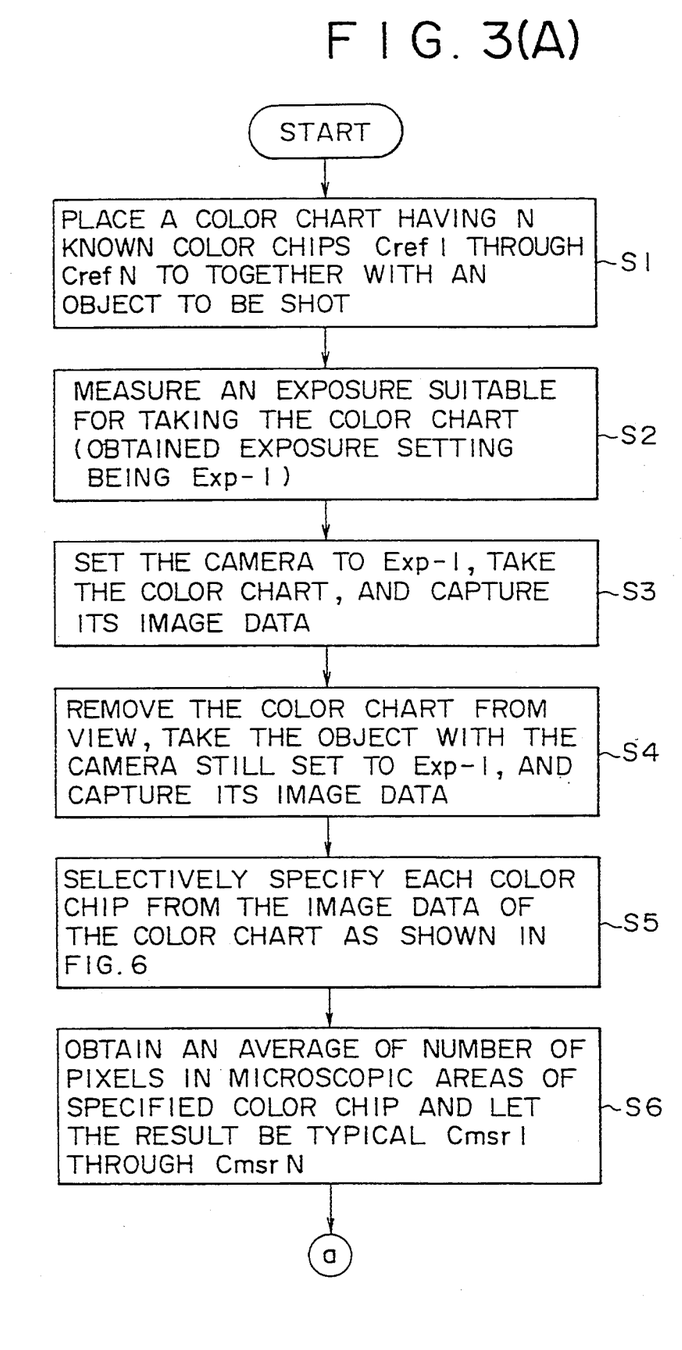
Figure 3B:
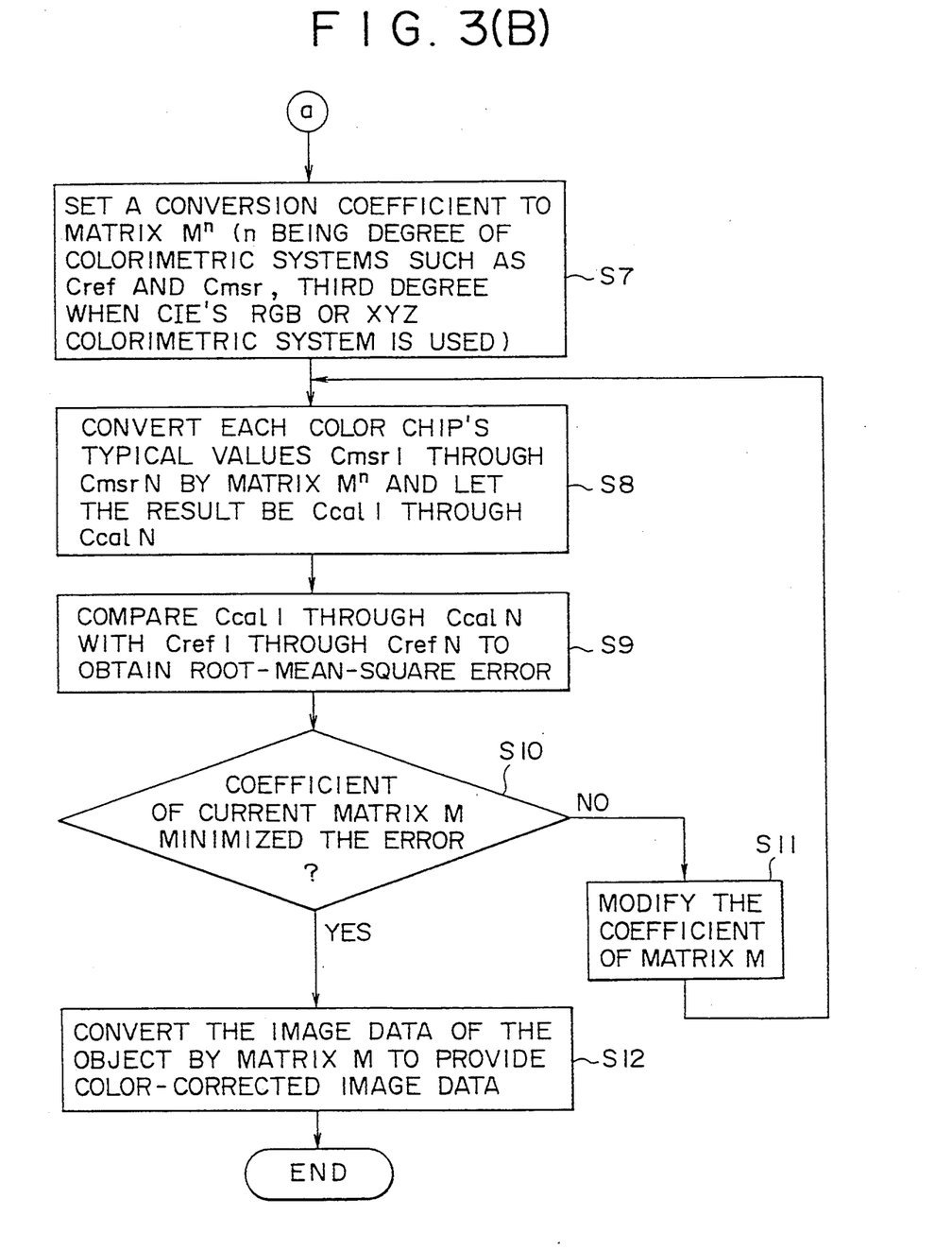

In carrying out the invention and according to another aspect thereof, there is provided a color image processing apparatus comprising an electronic camera 1 as picture taking means for taking a picture of a color chart 31 having a plurality of color chips 31a at a predetermined exposure as well as a picture of an object at the same exposure as above, steps S8 through S11 of FIG. 3 as computing means for computing a relation between the color of the color chips 31a of the color chart 31 and as means for imaging a color chart 31, and step S12 as correcting means for correcting the color of the picture of the object according to a computational result obtained in steps S8 through S11.

When a video camera or an electronic still camera is used as the electronic camera 1, data can be obtained by means of a digitizer 2 for processing by the color image processing apparatus. When a silver-salt film camera 3 is used, its output can be captured by means of a film scanner 4 for processing by the color image processing apparatus.

In the color image processing method, the color chart having a plurality of color chips is imaged, the relation between the color chips of the color chart and the color chip of the imaged color chart is computed, and the color of the picture of the object is corrected according to a computational result, allowing the picture to be displayed in constant color regardless of the picture-taking condition.

With the color image processing apparatus, the coefficient for specifying the relation between the color chips 31a of the color chart 31 and the color chips 31a of the imaged color chart 31 is computed in steps S8 through S11. Then, in step S12, the color of the picture of the object is corrected according to the coefficient obtained above. As a result, the picture will be displayed in the predetermined color.

DESCRIPTION OF THE PREFERRED EMBODIMENTS

Figure 1:
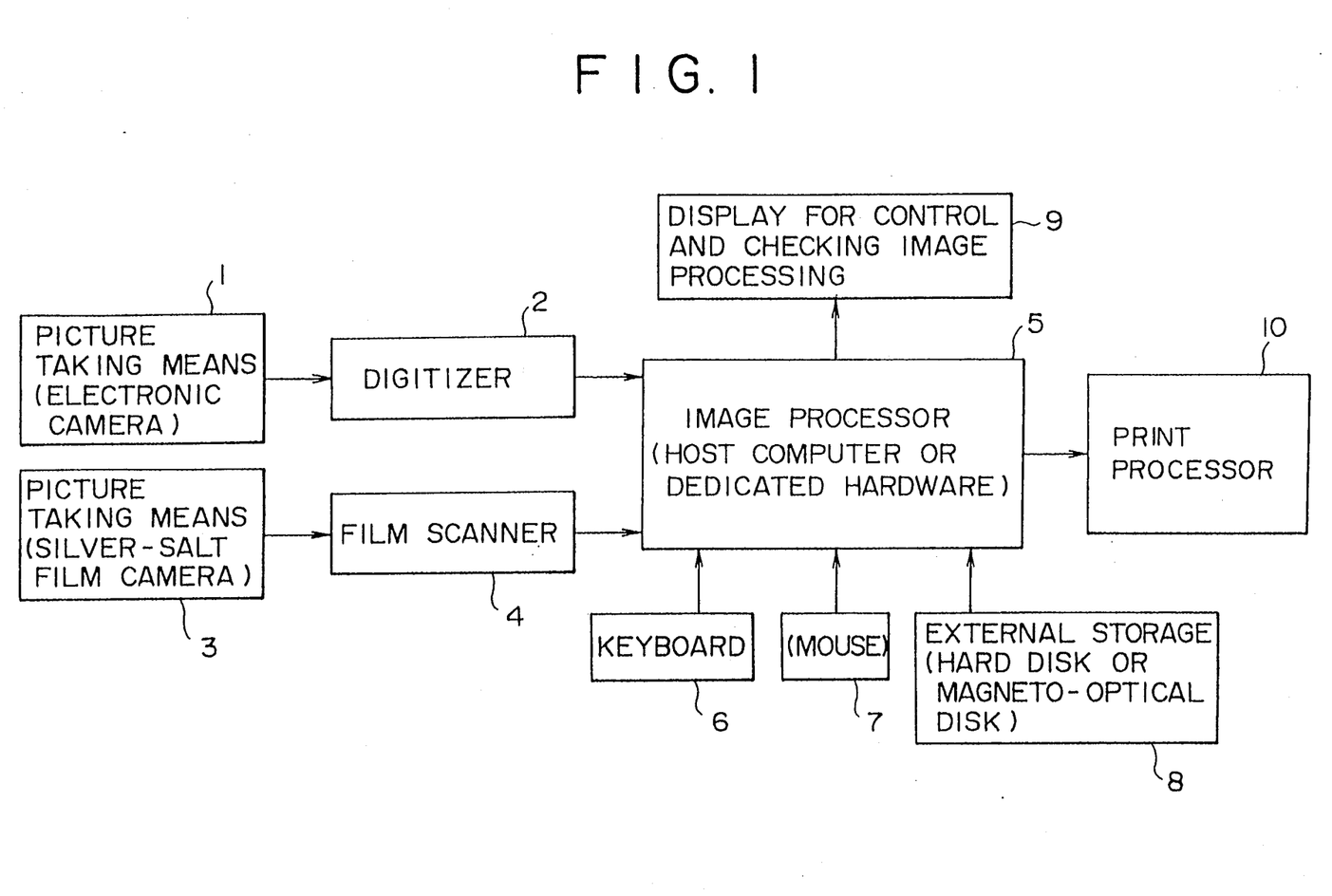
FIG. 1 is a block diagram illustrating one embodiment of the color image processor according to the present invention.

FIG. 1 is a diagrammatic illustration of one embodiment of the color image processing apparatus according to the present invention. Electronic camera 1 comprises an electronic still camera or a video camera, for example, to take a picture of (imaging) an object, not shown, and outputting a resultant image signal to digitizer 2. The digitizer 2 digitizes the video signal sent from the electronic camera 1 to supply a resultant digital signal to an image processor 5. On the other hand, when the object is photographed with a film camera (a silver-salt camera), an exposed and developed film is scanned by film scanner 4 to supply a resultant image data to the image processor 5.

The image processor 5 supplies the image data coming from the digitizer 2 or the film scanner 4 to external storage 8 comprising a hard disk or magnet-optical disk. The image processor 5 can also process the data stored in the external storage 8 to output a result to display 9 and, when required, to print processor 10 for printing on paper. Keyboard 6 and mouse 7 are operated as required to send a predetermined instruction to the image processor 5.

Figure 2:
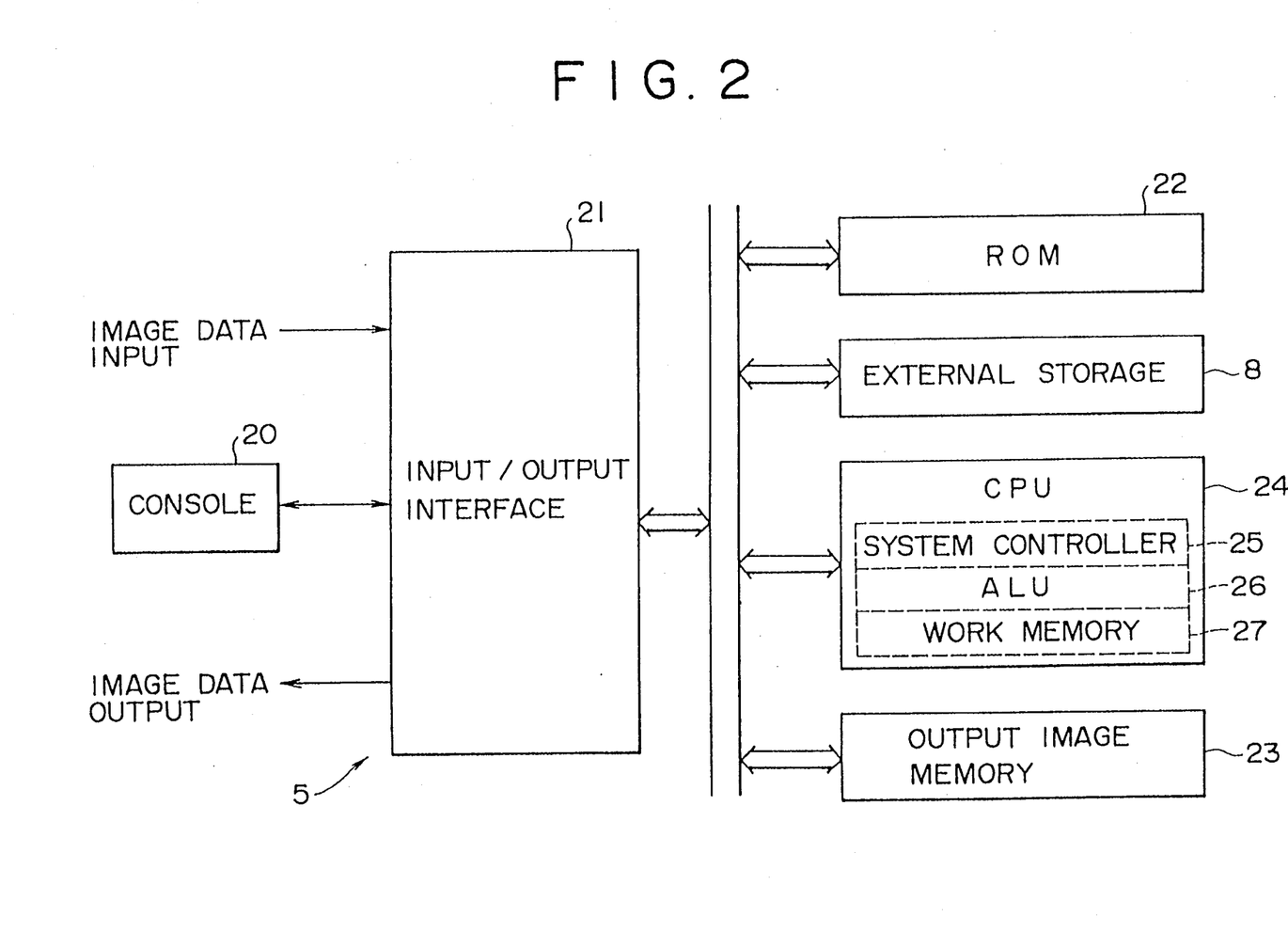
FIG. 2 is a block diagram illustrating an exemplary constitution of the image processor of FIG. 1.

The image processor 5 can be configured as shown in FIG. 2 for example. In the present embodiment, console 20 comprising the keyboard 6, the mouse 7, and the display 9 is connected to CPU 24 via input/output interface 21. The CPU 24 comprises system controller 25 for controlling the entire system, arithmetic logic unit (ALU) 26 for performing various calculations, and work memory 27 for storing data as required by the calculations. ROM 22 stores a program required for operating the CPU 24. Output image memory 23 is adapted to store image data to be sent to the display 9.

Figure 4:
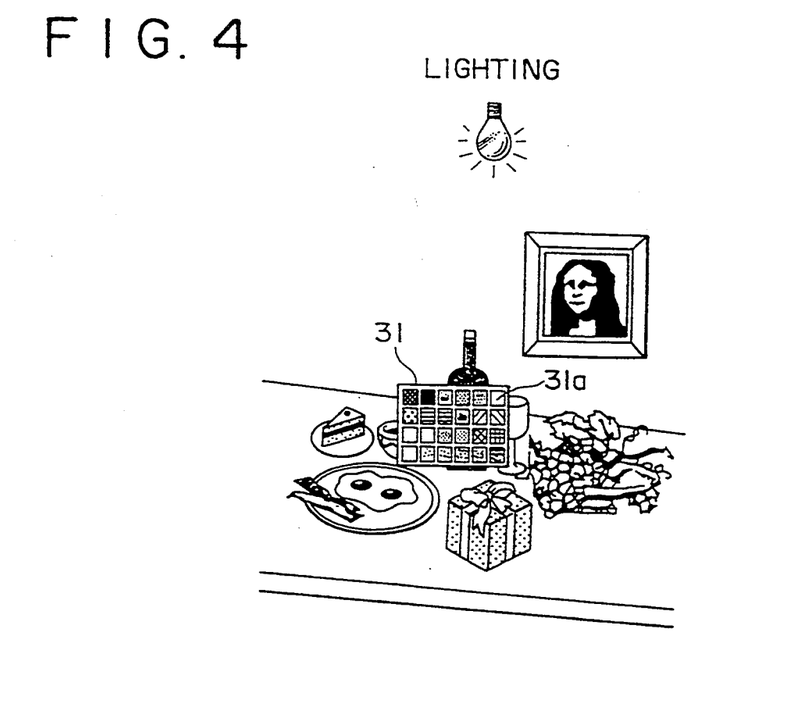
FIG. 4 is a diagram describing the processing of step S1 of FIG. 3.
Figure 5:
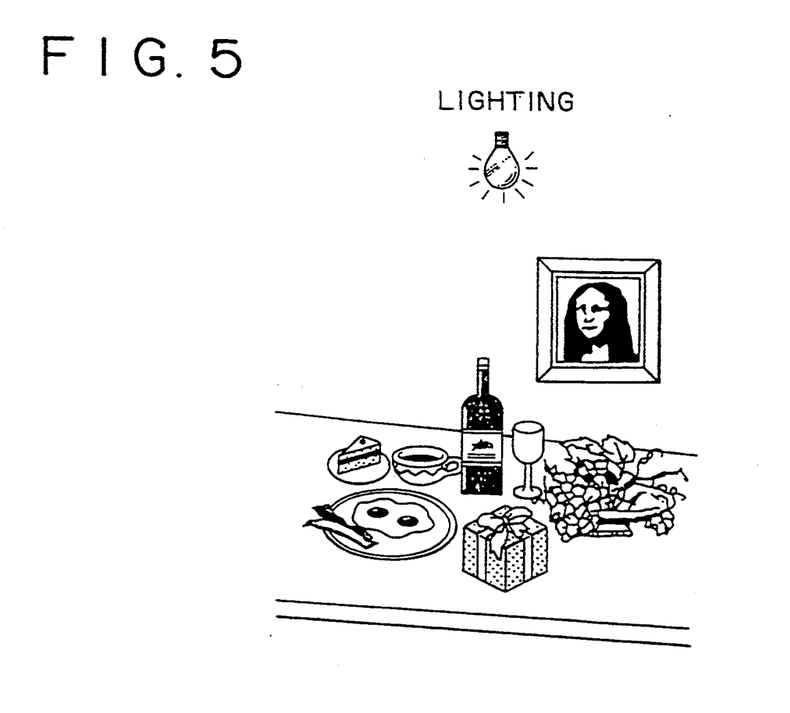
FIG. 5 is a diagram describing the processing of step S3 of FIG. 3.

In what follows, the operation of the embodiment will be described by referring to a flowchart of FIG. 3. First, in step S1, color chart 31 is placed near an object as shown in FIG. 4 for example so that they are shot by a camera together. The color chart 31 carries a plurality of color chips 31a, each having N colors represented by a colorimetric system provided by CIE (Commission Internationale de l'Eclairage). These colors are assumed to be uniformly arranged in color space. That is, the N colors can be expressed (or absolutely specified) by the following equation:

$$CrefN = \begin{pmatrix} X_N \\ Y_N \\ Z_N \end{pmatrix} \quad (1)$$

Then, in steps S2, an exposure level, suitable for taking a picture of the color chart 31, is measured. For example, the exposure setting may be Exp-1. An operator locks the setting on the camera. In step S3, an exposure setting is set to the value Exp-1 measured in step S2 and the color chart 31 is shot with a video camera for example. A resultant image data is digitized by the digitizer 2 to be stored in the external storage 8 (a hard disk for example) via the image processor 5.

In step S4, the camera operator removes the color chart 3 out of the view of the object and takes a picture of the object. An exposure level to be used this time is the same as set for shooting the color chart 31 in step S3. A resultant image data is digitized by the digitizer 2 to be stored in the external storage 8 via the image processor 5.

Figure 6:
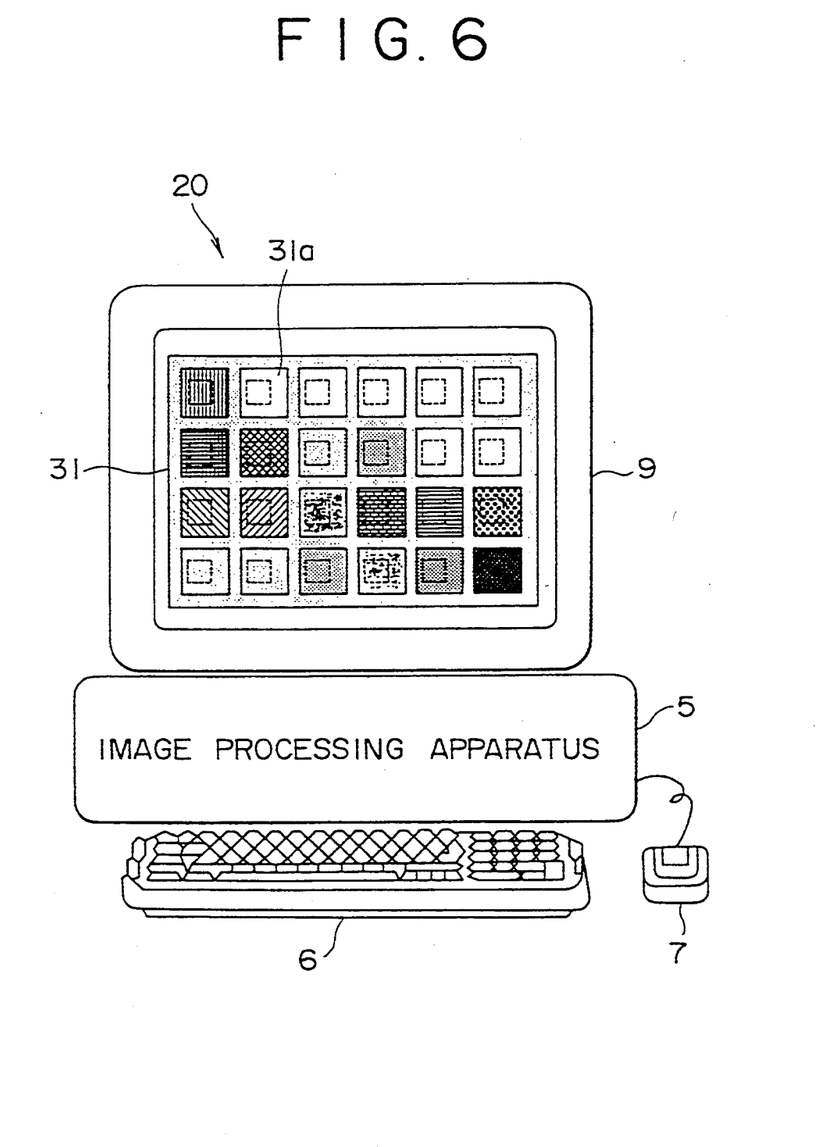
FIG. 6 is a diagram describing the processing of step S5 of FIG. 3.

In step S5, a predetermined range of each color chip 31a is selectively specified as shown in FIG. 6 from the image data of the color chart 31. That is, the operator, by using the keyboard 6 and/or the mouse 7, reads from the external storage 8 the image data of the color chart 31 obtained in step S3 to send it on the display 9. Internally, the CPU 24, in response to an instruction entered through the input/output interface 21, reads the data from the external storage 8 to store it in the output image memory 23. Then, the CPU 24 reads the image data from the output image memory 23 to sent it to the display 9. Thus, the image of the color chart 31 is displayed as shown in FIG. 6 for example.

Using the mouse 7, the operator further specifies the predetermined range of each of the N (24 in this embodiment) color chips 31a presented on the display 9. In FIG. 6, each specified range is indicated with a box enclosed with dashed lines.

In step S6, an average of the number of pixels in microscopic areas in each color chip 31a is obtained to be its typical values Cmsr1 through CmsrN as expressed in equation 2 below $$CmsrN = \begin{pmatrix} R_N \\ G_N \\ B_N \end{pmatrix} \quad (2)$$

Internally, the CPU reads data in the range specified in step S5 for each of the color chip 31a from among the data stored in the output image memory 23 to calculate the average value for each color chip 31a. Since the data stored in the output image memory 23 has been captured from the video camera, it depends on three primary colors R, G, and B. That is, this colorimetric system used is different from the colorimetric system (equation 1) used in specifying each color chip 31a of the color chart 31.

Consequently, in step S7, a coefficient of matrix M (consisting of coefficients a11 through a33) is set for interpolating a relation between the different colorimetric systems. That is, coefficients a11 through a33 in equation (3) are set to predetermined processing values.

$$\begin{pmatrix} XcalN \\ YcalN \\ ZcalN \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R_N \\ G_N \\ B_N \end{pmatrix} \quad (3)$$

where, XcalN indicates data obtained by converting data represented by the RGB colorimetric system (of video data) into data represented by XYZ colorimetric system (of the color chart 31).

In step S8, typical values Cmsr1 through CmsrN of the color chips 31a obtained in step S6 are multiplied by the matrix M. Resultant values, Ccal1 through CcalN are temporarily held in the work memory 27.

In step S9, the typical values Ccal1 through CcalN of the color chips 31a are compared with known color specification values Cref1 through CrefN of the color chips 31a to calculate a root-mean-square value of each difference. That is, equation (4) below is solved.

$$\text{Error} = \sum_{i=1}^{i=N} (Cref.i - Ccal.i)^2 \quad (4)$$

These calculations are performed by the ALU 26.

In step S10, it is determined, according to the coefficient of the current matrix M, whether the root-mean-square value error calculated in step S9 is minimal. If the difference is found not minimal, the coefficients a11 through a33 of the matrix M in equation (3) must be corrected to other values in step S11. With new values obtained, the processing is repeated beginning with step S8.

When a matrix M in which the root-mean-square value error is minimal has been obtained, the RGB colorimetric system image data of the object is converted by the matrix M into the XYZ colorimetric system data in step S12. The converted data is stored in the external storage 8 and the output image memory 23.

Thus, the image of the object is corrected with respect to the coefficient with which the color chart 31 can be displayed with true color, or the color having a smallest difference from the true color. Resultantly, the image having the true color with respect to the color chart 31 is presented on the display 9.

Supplying the data stored in the external storage 8 to the print processor 10 as required allows to print the image of true color. This data may also be converted in the data of RGB colorimetric system again to present a result on the display 9 with true color.

Figure 7:
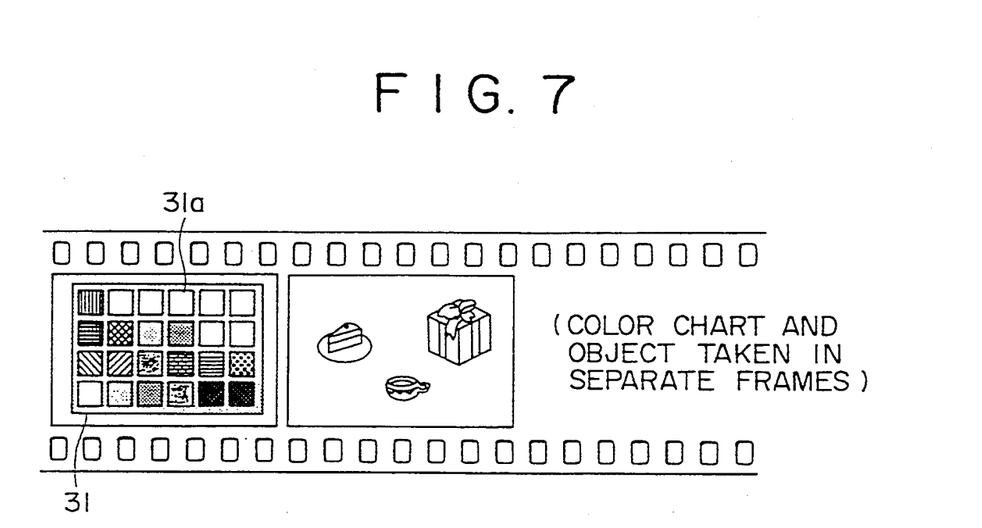
FIG. 7 is a diagram illustrating a film on which the color chart and the object are respectively shot in different frames.

If, in shooting the object with the video camera, there is no significant time interval between a time when the color chart 31 is shot with the object and a time when only the object is shot, there is no substantial change in a condition for taking pictures between the image data of the color chart 31 and the image data of the object. However, if the color chart 31 and the object are shot together with a film camera 3, characteristics of resultant images may change from one film to another. In this case, the color chart 31 is shot on a first frame of a film as shown in FIG. 7, followed by frames carrying pictures of the objects.

Figure 8:
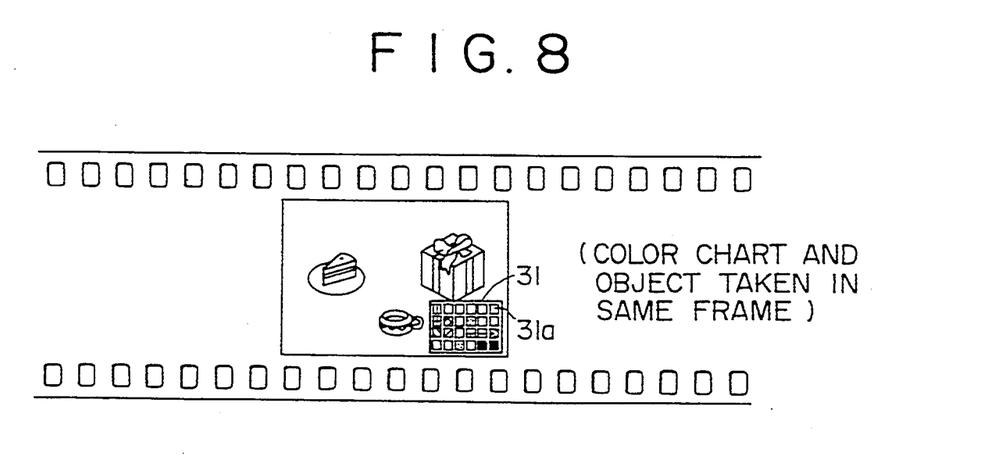
FIG. 8 is a diagram illustrating a film on which the color chart and the object are shot in a same frame.

Alternatively, the color chart 31 may be shot with the object in a same frame as shown in FIG. 8. In this case, it is desirable to locate the color chart 31 in one corner of each frame, thereby preventing the color chart 31 from obstructing a view of the picture of the object.

It should be noted that, with the above-mentioned embodiment, the matrix M is obtained by the aforestated calculation as required. It will be clear that a look-up table may also be prepared to which reference is made to obtain a predetermined matrix.

It will be apparent that the color image processing method according to the invention, as described above, calculates the relation between the color of the color chip of the color chart and the color of the color chip of the imaged color chart and the image of the object is corrected by correcting means based on a calculation result, allowing the image to be displayed always in constant color regardless of differences between shooting conditions.

It will also be apparent that the color image processing apparatus according to the invention, as described above, calculates the relation between the color of the color chip of the color chart and the color of the color chip of the color imaged color chart and the image of the object is corrected by correcting means based on a calculation result, allowing the image to be displayed always in true color regardless of differences between shooting conditions. While the preferred embodiment of the invention has been described using specific terms, such description is for illustrative purpose only, and it is to be understood that changes and variations may be made without departing from the spirit or scope of the appended claims.

What is claimed is:

1. A color image processing method for processing a color image of an object, comprising the steps of:
    imaging a color chart comprised of a plurality of color chips having respective known colorimetric parameters under predetermined exposure conditions;
    imaging an object under exposure conditions equal to said predetermined exposure conditions so as to obtain a color image of the object;
    determining colorimetric parameters of each of the imaged color chips of the imaged color chart;
    computing a correlation between said known colorimetric parameters of each of said color chips of said color chart and the determined colorimetric parameters of each of the imaged color chips of said imaged color chart; and
    correcting said color image of the object in accordance with the computed correlation.

2. The color image processing method according to claim 1, wherein said correlation is computed from a coefficient of a conversion matrix between said known colorimetric parameters of each of said color chips of said color chart and said determined colorimetric parameters of each of said imaged color chips of said imaged color chart.

3. The color image processing method according to claim 2, wherein each of said color chips of said color chart and each of said imaged color chips of said imaged color chart have a color arranged uniformly in a predetermined color space.

4. The color image processing method according to any one of claims 1, 2 and 3, where said imaged color chart is imaged by a silver-salt film camera in a same film frame in which said object is imaged.

5. The color image processing method according to any one of claims 1, 2, 3 and 4, wherein said imaged color chart is imaged by a silver-salt film camera in a film frame different from a film frame in which said object is imaged.

6. A color image processing apparatus for processing a color image of an object, comprising:
    means for imaging a color chart comprised of a plurality of color chips having respective known colorimetric parameters under predetermined exposure conditions;
    means for imaging an object under exposure conditions equal to said predetermined exposure conditions so as to obtain a color image of the object;
    means for determining colorimetric parameters of each of the imaged color chips of the imaged color chart;
    computing means for computing a correlation between said known colorimetric parameters of each of said color chips of said color chart and the determined colorimetric parameters of each of the imaged color chips of said imaged color chart; and
    correcting means for correcting said color image of the object in accordance with the computed correlation.

7. The color image processing apparatus according to claim 6, wherein said means for imaging said color chart and said object comprise a video camera and a digitizer for converting an analog video signal from said video camera into a corresponding digital signal to be supplied to said computing means.

8. The color image processing apparatus according to claim 6, wherein said means for imaging said color chart and said object comprise an electronic still camera and a digitizer for converting an analog video signal from said electronic still camera into a corresponding digital signal to be supplied to said computing means.

9. The color image processing apparatus according to claim 6, wherein said means for imaging said color chart and said object comprise a silver-salt film camera and a film scanner for converting an image on a film imaged by said silver-salt film camera into a corresponding digital signal to be supplied to said computing means.

10. The color image processing method according to claim 1, wherein each of said color chips of said color chart and each of said imaged color chips of said imaged color chart have a color arranged uniformly in a predetermined color space.

11. The color image processing method according to claim 1, wherein the imaged color chart and the imaged object are imaged together.

12. The color image processing method according to claim 1, wherein said predetermined exposure condition includes an exposure setting of EXP-1.

* * * * *